United States Patent [19]

Deimling et al.

[11] Patent Number: 4,557,947
[45] Date of Patent: Dec. 10, 1985

[54] PROCESS FOR POLISHING THE SURFACES OF MAGNETIC STORAGE DISKS

[75] Inventors: Karl Deimling, Willstaett; Roland Falk, Achern; Aribert Krug, Achern-Fautenbach; Peter Nagel; Rudolf Sand, both of Willstaett, all of Fed. Rep. of Germany

[73] Assignee: BASF Aktiengesellschaft, Fed. Rep. of Germany

[21] Appl. No.: 127,085

[22] Filed: Mar. 4, 1980

[30] Foreign Application Priority Data

Mar. 20, 1979 [DE] Fed. Rep. of Germany ....... 2910807

[51] Int. Cl.$^4$ .............................................. H01F 10/02
[52] U.S. Cl. .................................... 427/130; 427/128
[58] Field of Search ................. 427/130, 128; 428/900

[56] References Cited

U.S. PATENT DOCUMENTS 2,913,246 11/1959 Hagopian ........................... 274/41.4
3,398,011 8/1968 Neirotti et al. ................. 427/130 X Primary Examiner—Bernard D. Pianalto
Attorney, Agent, or Firm—Keil & Weinkauf

[57] ABSTRACT

A process for polishing the ground surfaces of magnetic storage disks which consist of a rigid substrate provided on both sides with a firmly adhering magnetic coating consisting of a magnetic material finely dispersed in an organic polymer and conventional additives, by pressing felt rings or felt disks against the moving magnetic storage disk, to the surface of which an aqueous emulsion containing butyl acetate with or without butane-1,4-diol is applied.

4 Claims, No Drawings

PROCESS FOR POLISHING THE SURFACES OF MAGNETIC STORAGE DISKS

The present invention relates to a process for polishing the ground surfaces of magnetic storage disks which consist of a rigid substrate provided on both sides with a firmly adhering magnetic coating consisting of a magnetic material finely dispersed in an organic polymer and conventional additives.

Magnetic disks are employed extensively for storing, in particular, digital information. It is known to manufacture such disks by coating circular disks of aluminum or of an aluminum alloy, which are provided with a circular hole in the center for receiving suitable holding and driving means, with a fluid dispersion which contains a magnetizable material finely dispersed in a polymeric binder, after which this coating is dried and/or cured, and ground. The spin-coating process, as described, for example, in U.S. Pat. No. 3,198,657, has proved to be a particularly suitable coating method. Other conventional methods of applying the magnetic coating comprise dipping the substrate into the fluid coating mixture, or spraying it with the mixture.

When such magnetic disks are used in recording equipment, as described, for example, in U.S. Pat. No. 3,176,281, the information is recorded in concentric circular tracks by means of a write/read head which flies above the magnetic coating on the rotating disk. In endeavors to increase the storage density of such recording media, the thickness of the magnetizable coating has repeatedly been reduced. The flying height of the magnetic heads has had to be reduced accordingly. For example, in conventional equipment the flying height, i.e. the distance between the flying magnetic head and the rotating disk, had to be reduced from an original value of 2.5 $\mu$m to 0.5 $\mu$m. In order to achieve this flying height, exceptionally high demands are made on the planeness of the surface of magnetic storage disks. The surface must be free from irregularities since, during rotation of the disk, every surface defect, however slight, causes an axial deflection of the magnetic head which can result in a faulty signal or even in a head crash, in which the magnetic head strikes the surface of the disk and tears out part of the magnetic coating.

In order to achieve the requisite extremely low surface roughness of the magnetic coatings, the latter are ground in a particular manner, as described, for example, in German Pat. No. 2,150,993. For this purpose hard abrasives, e.g. diamond dust or corundum powder, are used either as a grinding paste on a carrier, or bonded to a grinding tape. It is true that grinding the magnetic coating in this way results in a very plane surface, but it still does not give magnetic disks suitable for high storage densities. The reason for this is that each abrasive particle cuts into the surface during grinding, resulting in a small groove with raised edges. These protruding edges result in a micro-roughness which suffices to interfere with the flying behavior of the magnetic head. To avoid such interference, the micro-roughness should correspond to an average peak-to-valley height $R_z$ (according to DIN 4762) of less than 0.30 $\mu$m.

It is known that the micro-roughness of surfaces can be improved by polishing. Usually, this is done by treating the ground surface of the magnetic coating, which resembles a film of pigmented paint, with a felt disk or felt ring running at high speed. The local heat thereby generated causes the uppermost layer of the coating to flow, so that the material is not worn away but only displaced. It is true that a high gloss can be achieved by levelling the peaks and valleys in this way, but the degree of micro-roughness required for steady flight of the magnetic head cannot be attained. Even when using a polishing paste or polishing emulsion conventionally used for metal polishing (W. Burkart and K. Schmotz, Handbuch für das Schleifen und Polieren, Leuze-Verlag, 1964, pages 37–44), results which meet the demands made on disk memories cannot be achieved. Nor are satisfactory results obtained with the usual method of polishing plastics with a fabric disk, using polishing waxes. It is true that satisfactory micro-roughness is achieved with the buffing disks employed in other polishing methods, but in the case of magnetic coatings it is not possible to prevent erosion of the surface here and there, which in turn again results in greater roughness.

It is an object of the present invention to provide a process for polishing the surfaces of ground magnetic coatings of magnetic storage disks, which enables the micro-roughness to be improved without adversely affecting the surface planeness achieved during the preceding grinding process.

We have found that this object is achieved and that the surfaces of ground magnetic coatings of magnetic storage disks, which consist of a rigid substrate provided on both sides with a firmly adhering magnetic coating consisting of a magnetic material finely dispersed in a curable organic binder and conventional additives, can be polished by pressing felt rings or felt disks against the magnetic storage disks which rotate alternately in opposite directions and to whose surfaces an aqueous emulsion is applied, and thus exhibit the properties required according to the invention, if from 2 to 25 percent by weight of butyl acetate are added to the aqueous emulsion employed during polishing.

The above process may be carried out with the conventional emulsions used for the purpose, such as are used for cleaning and removing dirt particles during polishing, the emulsions consisting of from 40 to 90 percent by weight of water and from 10 to 60 percent by weight of conventional emulsifiers. According to the invention, from 2 to 25, preferably from 12 to 20, percent by weight of butyl acetate are added to the above type of emulsion. In developing the process according to the invention, it has been found particularly advantageous if, in addition to the stated amounts of butyl acetate, from 1 to 4 percent by weight of butane-1,4-diol are also added to the emulsion.

A variety of substances or mixtures thereof may be used as emulsifiers, but they must be miscible with water, with butyl acetate and with butane-1,4-diol. For example, a mixture of fats saponified with sodium hydroxide or potassium hydroxide has proved suitable for the present process. Advantageously, the fatty acid mixture consists of 20% of palmitic acid, 60% of linoleic and linolenic acid, 13% of stearic acid, 4% of lauric acid and 3% of myristic acid. Oxyethylation products of alkylphenols, especially a nonylphenol with 20 ethoxy groups, may also be used.

To carry out the process according to the invention, the magnetic storage disk which carries a ground magnetic coating on both sides is clamped on a driven spindle which causes the disk to rotate alternately in opposite directions. The surface of the disk is then moistened with the emulsion containing butyl acetate and is subsequently polished by pressing polishing heads, provided with felt rings, against the rotating disk. During the polishing operation, the emulsion is uniformly distributed over the surface. After this treatment, the disk is rinsed with water to remove the emulsion and the abraded material contained therein. The disk is dried by rinsing it with a lower alcohol. In other respects, the conventional conditions used in polishing processes are employed.

The process according to the invention gives magnetic storage disks which are, by virtue of the excellent micro-roughness that can be achieved, particularly suitable for use in memory processing units where, because of the desired high storage density, the magnetic heads are at a distance of less than 1 μm above the rotating surfaces of the magnetic disks. The term "micro-roughness" denotes those irregularities on a surface whose size lies in the wavelength range of visible light.

Using the process according to the invention, which is illustrated in the Examples which follow, all magnetic storage disks which have an average peak-to-valley height $R_2$ of less than 0.40 μm (measured according to DIN 4762, with a cut-off of 0.8 μm over a distance of 4.8 mm; needle radius; 3 μm) achieved by prior art grinding, can be substantially improved in respect of their micro-roughness.

Magnetic storage disks, in the above sense, comprise a substrate in the form of a circular aluminum alloy disk having a circular hole in the middle and ground and lapped surfaces. The magnetic coating consisting of a dispersion of a magnetic material, in most cases acicular gamma-iron(III) oxide, having an average particle length of from 0.1 to 2 μm, in a curable organic binder is applied to this disk. Particularly suitable binders—which are advantageously used in the form of their solutions or of solutions of their components—are those with reactive epoxy groups.

The polyglycidyl ethers of aliphatic and aromatic polyols, e.g. glycerol, butane-1,4-diol, bis-(hydroxymethyl)-propane-(2,2), pentaerythritol, bisphenol A (bis-2,2-(4-hydroxyphenyl)-propane), bis-(4-hydroxyphenyl)-methane and the like, which may be obtained by reacting the polyol with epichlorohydrin and are commercially available as surface-coating binders, have proved very suitable. They can be cured at elevated temperatures by means of, for example, polyamines, polyaminoamides, curable phenolic resins of the resol type (which may or may not be plasticized), curable urea-formaldehyde precondensates or curable melamine-formaldehyde precondensates, the methylol groups of which may also be etherified with lower alcohols. Of course, the coatings can also contain conventional additives, e.g. dispersants or lubricants, in the conventional small amounts. To prepare the dispersion, the mixture of magnetic material, curable binder and sufficient solvent is dispersed by a conventional dispersing process, for example in a ball mill. The application of the dispersion to the substrate can also be effected by conventional methods. It has proved very advantageous first to apply a layer of the dispersion to the slowly rotating substrate (rotating for example at a speed of from about 100 to 500 rpm), and then to produce the desired coating thickness by rotating the disk at a higher speed, preferably at from about 1,000 to 3,000 rpm. A suitable coating technique is described in U.S. Pat. No. 2,913,246. In this conventional method, the substrates are provided with a magnetic coating on both sides. Thereafter the layers of dispersion are dried, in a first stage, by evaporating the solvent, following which the binder is cured at an elevated temperature. The required surface planeness of the resulting magnetic coatings is obtained by grinding with conventional belt-grinding equipment or by using the method of German Published Application DAS 2,150,993.

EXAMPLE 1

To polish a magnetic disk having a magnetic coating from 1 to 3 μm thick on both sides and having an initial average peak-to-valley height $R_z$ of <0.4 μm, 1,160 parts of an emulsifier, consisting of the sodium salts of a mixture of 60 parts of linoleic and linolenic acid, 20 parts of palmitic acid, 13 parts of stearic acid, 4 parts of lauric acid and 3 parts of myristic acid, are first added to 3,440 parts of water, and 680 parts of butyl acetate and 68 parts of butane-1,4-diol are then introduced.

This emulsion is applied, by means of a metering pump, in an amount of about 3 grams per side, to the surface of the ground magnetic disk which is mounted on a spindle and caused to rotate alternately in opposite directions.

To distribute the fluid, rotating felt disks are pressed against the magnetic disk rotating at 300 rpm. The polishing disks consist of a metal ring, to which is fixed a 10 mm thick felt ring 100 mm in diameter. The polishing time is 40 seconds. After this treatment, the magnetic disk is cleaned by spraying it with demineralized water at 20° C., which flushes the polishing fluid from the disk surface. The disk is then dried by spraying it with propyl alcohol.

A magnetic storage disk polished in this way is subjected to the tests described below. The test results are shown in the Table.

1. Abrasion test

A white polishing cloth impregnated with propanol is pressed against a magnetic storage disk mounted on a spindle and rotating about its axis, thereby wiping the surface of the disk. The intensity of the color of the abraded material on the white cloth is used to assess the abrasion characteristics of the magnetic coating and is awarded a rating, 1 denoting no abrasion, i.e. the cloth remains white, and 6 severe abrasion, the color being blackish brown, which indicates a large quantity of abraded oxide material. The intermediate stages range from pale yellow, through yellow and yellowish brown, to brown.

2. Surface roughness

The roughness of the magnetic coating surface is measured in accordance with DIN 4762 using a profilometer (Perth-o-Meter manufactured by Perthen, Hanover, Germany). In each case, the $R_2$ value is determined.

3. Flight test

The flying behavior is assessed on a conventional test apparatus. The magnetic disk to be examined rotates on a test drive unit at 3,600 rpm. A test head, fitted with a piezoelectric sensor, flies at a height of 0.75 μm above the disk and is pushed radially over the surface of the disk during the test. Any unevenness in the disk surface causes the test head to be deflected from its steady flight path. The accelerations associated with these deflections produce electrical signals which are integrated over the test distance and defined as a flight index. Accordingly, a flight index of 1 denotes a surface with negligible micro-roughness, whilst a flight index of 4 is found in the case of an inadequately ground and polished magnetic coating.

4. Critical speed

In the course of the flight test, the speed of rotation of the magnetic disk is reduced continuously. As a result, the flying height of the head diminishes until, at the critical speed, the head touches the disk. The lower the critical speed in rpm, the lower the micro-roughness of the magnetic coating is.

EXAMPLE 2

The procedure followed is as described in Example 1, except that the emulsion consists of 1,040 parts of water, 1,160 parts of an emulsifier consisting of nonylphenol with 20 ethoxy groups, 340 parts of butyl acetate and 34 parts of butane-1,4-diol.

The results are shown in the Table.

Example 3

The procedure followed is as described in Example 1, except that the emulsion consists of 76 parts of water, 11 parts of the emulsifier employed in Example 1, and 13 parts of butyl acetate.

The results are shown in the Table.

COMPARATIVE EXPERIMENT 1

A ground magnetic disk, like the one subjected to polishing in Example 1, is treated for only 1 minute with an isopropanol-impregnated polishing cloth and is then tested. The results are shown in the Table.

COMPARATIVE EXPERIMENT 2

The procedure described in Example 1 is followed, except that the emulsion consists only of 90 parts of water and 10 parts of the emulsifier employed in Example 1.

TABLE

|  | Example | | | Comparative Experiment | |
|---|---|---|---|---|---|
|  | 1 | 2 | 3 | 1 | 2 |
| Abrasion test/rating | 1 | 2 | 2 | 4 | 5 |
| average peak-to-valley height $R_z$ ($\mu$m) | 0.23 | 0.25 | 0.27 | 0.4 | 0.45 |
| Flight index | 1.0 | 1.2 | 1.3 | 2.25 | 4 |
| Critical speed (rpm) | 700 | 800 | 850 | 1400 | 1700 |

We claim:

1. A process for polishing the surfaces of the ground magnetic coatings of magnetic storage disks, said disks consisting essentially of a rigid substrate provided on both sides with a firmly adhering magnetic coating of a magnetic material finely dispersed in a cured organic binder, which process comprises; pressing a felt ring or felt disk against the surfaces of the magnetic storage disks as they are rotated alternately in opposite directions, said felt ring or felt disk having applied thereto
   an aqueous emulsion consisting essentially of water, one or more emulsifiers and from 2 to 25% by weight of butyl acetate, based on the weight of the emulsion, and thereafter rinsing the disks to remove the emulsion and any abraded material contained therein.

2. The process of claim 1, wherein the emulsion consists essentially of 40 to 90% by weight of water, 10 to 60% by weight of one or more emulsifiers and from 2 to 25% by weight of butyl acetate.

3. The process of claim 1 or 2, wherein the amount of butyl acetate is from 12 to 25% by weight based on the weight of the emulsion.

4. The process of claim 1 or 2, wherein from 1 to 4% by weight of butane-1,4-diol is added to the emulsion.

* * * * *